US011533620B2

(12) United States Patent
Bogusz et al.

(10) Patent No.: US 11,533,620 B2
(45) Date of Patent: Dec. 20, 2022

(54) METHOD OF MANAGING A TAMPER-PROOF DEVICE COMPRISING A PLURALITY OF SOFTWARE CONTAINERS

(71) Applicant: THALES DIS FRANCE SA, Meudon (FR)

(72) Inventors: François Bogusz, Seoul (KR); Fabien Courtiade, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 276 days.

(21) Appl. No.: 16/771,749

(22) PCT Filed: Dec. 4, 2018

(86) PCT No.: PCT/EP2018/083513
§ 371 (c)(1),
(2) Date: Jun. 11, 2020

(87) PCT Pub. No.: WO2019/115294
PCT Pub. Date: Jun. 20, 2019

(65) Prior Publication Data
US 2021/0144554 A1    May 13, 2021

(30) Foreign Application Priority Data
Dec. 13, 2017  (EP) ..................... 17306765

(51) Int. Cl.
*H04W 12/086* (2021.01)
*H04W 12/37* (2021.01)
(Continued)

(52) U.S. Cl.
CPC ........... *H04W 12/086* (2021.01); *H04W 8/18* (2013.01); *H04W 12/37* (2021.01); *G06F 9/45508* (2013.01); *H04W 76/10* (2018.02)

(58) Field of Classification Search
CPC . G06F 9/45508; H04W 12/08; H04W 12/086; H04W 12/37; H04W 12/40;
(Continued)

(56) References Cited

U.S. PATENT DOCUMENTS

2014/0134981 A1   5/2014  Park et al.
2016/0246611 A1   8/2016  Li et al.

FOREIGN PATENT DOCUMENTS

CA    2829620 A1    9/2012
WO    2008123827 A1   10/2008

OTHER PUBLICATIONS

International Search Report and Written Opinion issued in corresponding International Patent Application No. PCT/EP2018/083513, 11 pages (dated Jan. 14, 2019).
(Continued)

*Primary Examiner* — Ankur Jain
(74) *Attorney, Agent, or Firm* — Adam Lewental; Thales DIS CPL USA, Inc

(57) ABSTRACT

The invention is a method for managing a tamper-proof device comprising first and second software containers, said tamper-proof device being included in a host device comprising a baseband unit. Said first software container is designed to emulate an eUICC and is in a deactivated state. The second software container comprises a set of rules. The baseband unit comprises an activator agent which retrieves both location data broadcasted by a telecom network and the set of rules from the second software container. The activator agent checks if activation of the first software container is authorized by one of said rules for the location data and requests activation of the first software container only in case of successful checking.

13 Claims, 3 Drawing Sheets

(51) Int. Cl.
*H04W 8/18* (2009.01)
*H04W 76/10* (2018.01)
*G06F 9/455* (2018.01)

(58) Field of Classification Search
CPC ....... H04W 48/04; H04W 76/10; H04W 8/18; H04W 8/183
See application file for complete search history.

(56) References Cited

OTHER PUBLICATIONS

SGP.22—RSP Technical Specification, Version 2.0, GSM Association, http://www.gsma.com/rsp/wp-content/uploads/docs_new/SGP.22_v2.0-Technical_Specification.pdf, 230 pages (Oct. 14, 2016).

| MCC | MNC | Authorized ? |
|---|---|---|
| MCC_1 | MNC_1 | Yes |
| MCC_2 | MNC_3 | No |
| MCC_2 | MNC_3 | Yes |
| ... | ... | ... |
| MCC_n | MNC_n | No |

METHOD OF MANAGING A TAMPER-PROOF DEVICE COMPRISING A PLURALITY OF SOFTWARE CONTAINERS

FIELD OF THE INVENTION

The present invention relates to methods of managing a tamper-proof device comprising a plurality of software containers. It relates particularly to methods of managing activation of the software containers.

BACKGROUND OF THE INVENTION

A tamper-proof device, also called secure element, is a physical component able to store data and to provide services in a secure manner. In general, a tamper-proof device has a limited amount of memory, a processor with limited capabilities and is devoid of battery. For instance a UICC (Universal Integrated Circuit Card) is a tamper-proof device embedding SIM applications for telecommunication purposes. A tamper-proof device can be installed, fixedly or not, in a terminal, like a mobile phone for example. In some cases, the terminals are constituted by machines that communicate with other machines for M2M (Machine to Machine) applications.

A tamper-proof device can be in the format of a smart card, or may be in any other format such as for example but not limited to a packaged chip as described in PCT/SE2008/050380, or any other format.

It is known to solder or weld the tamper-proof device in a host device, in order to get it dependent of this host device. This is done in M2M (Machine to Machine) applications. The same objective is reached when a chip (a tamper-proof device) containing a Payment application, SIM or USIM applications and associated files is contained in the host device. The chip is for example soldered to the mother-board of the host device or machine and constitutes an embedded UICC (eUICC).

A tamper-proof device like an embedded UICC (eUICC) can contain several telecom profiles (subscriptions) attached to one or several telecom operators. Such tamper-proof devices must comply with GSMA SGP .22 RSP Technical Specification standard due to interoperability reasons.

It is also know to use tamper-proof devices complying with GlobalPlatform Card Specification standard. Such tamper-proof devices—including embedded secure element (or eSE)—can contain non-telecom applications like payment applications or access applications.

So far these two kinds of tamper-proof device are implemented through separate physical components. Nowadays, a new need is emerging: embedding both features of a eUICC and of an eSE in a single tamper-proof device.

In some countries, the law or commercial agreement and policy between OEM and Mobile Network Operator forbid the deployment of eUICC products. Due to industrialization flow and supply chain requirements, there is a need to insert a unique type of tamper-proof device in telecom equipments and to activate or not the eUICC according to the country where the telecom equipment is located.

There is a need to manage activation of a software container embedded in a single tamper-proof device.

SUMMARY OF THE INVENTION

The invention aims at solving the above mentioned technical problem.

The object of the present invention is a method for managing a tamper-proof device comprising first and second software containers. The tamper-proof device is included in a host device comprising a baseband unit. Said first software container is designed to emulate a eUICC. Said first software container is in a deactivated state. Said second software container comprises a set of rules. The baseband unit comprises an activator agent which retrieves a location data broadcasted by a telecom network and which retrieves the set of rules from the second software container. The activator agent checks if activation of the first software container is authorized by one rule of said set for the location data. The activator agent requests activation of the first software container only in case of successful checking.

Advantageously, the location data may comprise at least one of the following group: country identifier and network identifier.

Advantageously, said first software container may comprise at least one Telecom profile compatible with GSMA SGP .22 RSP Technical Specification standard and said second software container may comprise a security domain compatible with GlobalPlatform Card Specification standard.

Advantageously, the activator agent may request activation of the first software container by executing a script precomputed with static keys. The script may comprise the following ordered commands:
 selecting an admin security domain located in the tamper-proof device,
 establishing a secure channel between the admin security domain and said activator agent,
 sending, through the secure channel, an activation command aiming at activating the first software container.

Advantageously, the tamper-proof device may be an embedded secure element, an integrated secure element, a secure enclave, a smart card or a Machine-To-Machine device.

Another object of the invention is a baseband unit for managing a tamper-proof device comprising first and second software containers. The baseband unit and tamper-proof device are included in a host device. Said first software container is designed to emulate a eUICC. The baseband unit comprises an activator agent configured to retrieve a location data broadcasted by a telecom network and to retrieve the set of rules from the second software container. The activator agent is configured to check if activation of the first software container is authorized by one rule of the set for the location data. The activator agent is configured to activate the first software container only in case of successful checking.

Advantageously, the location data may comprise at least one of the following group: country identifier and network identifier.

Advantageously, said first software container may comprise a Telecom profile compatible with GSMA SGP .22 RSP Technical Specification standard and said second software container may comprise a security domain compatible with GlobalPlatform Card Specification standard.

Advantageously, the activator agent may be configured to request activation of the first software container by executing a script precomputed with static keys, said script comprising the following ordered commands:
 selection of an admin security domain located in the tamper-proof device,
 establishment a secure channel between the admin security domain and said activator agent, and sending through the secure channel an activation command aiming at activating the first software container.

Advantageously, the tamper-proof device may be an embedded secure element, an integrated secure element, a secure enclave, a smart card or a Machine-To-Machine device.

Another object of the invention is a telecom device which embeds a baseband unit according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of tamper-proof devices or secure elements intended to contain several software containers and able to communicate with a baseband unit. The tamper-proof device may be coupled to any type of host machine. For example the host machine may be a mobile phone, a vehicle, a meter, a slot machine, a TV, a tablet, a laptop, a connected watch, or a computer.

The tamper-proof device may be an embedded secure element (eSE), an integrated secure element (iSE), a secure enclave, a smart card or a Machine-To-Machine device. An integrated secure element is a secure element integrated in a hardware element providing additional functionalities distinct from the features of the secure element. For instance a baseband modem may comprise an iSE. More information related to eSE and iSE may be found in Javacard Platform Classic Edition v3.0.5 and Global Platform Card Specifications v2.3.

One or several Mobile Operator Profiles may be stored inside security domains within the eUICC. It is to be noted that the eUICC activation operation is significantly different from the operation of activation of a telecom profile (i.e. subscription).

Figure 1:
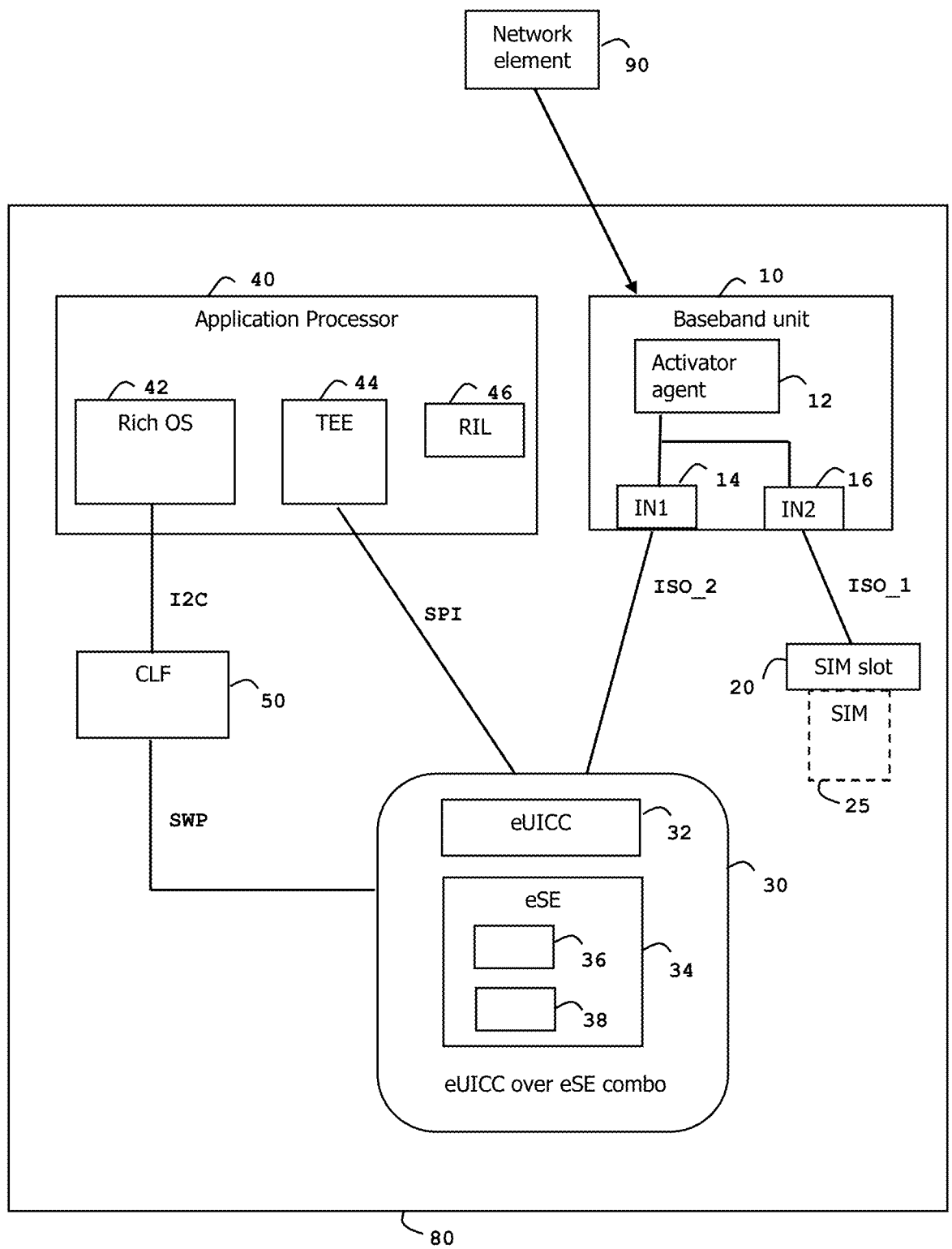
FIG. 1 is an example of hardware architecture of a host device comprising a tamper-proof device and a baseband unit according to the invention.

FIG. 1 shows an example of hardware architecture of a host device 80 comprising a tamper-proof device 3 and a baseband unit 10 according to the invention.

In this example, the host device 80 is a mobile phone, the tamper-proof device 30 is a secure element welded to the mobile phone 80. For instance the tamper-proof device 30 may be a chip embedded in the smart phone 80.

The mobile phone 80 comprises an application processor 40 which includes a Rich OS 42, a Trusted Execution Environment 44 (TEE) and a Radio Interface Layer 46 (RIL). The mobile phone 80 also comprises a NFC controller 50 (also called CLF) connected to both the Rich OS 42 (through a wired connection using I2C protocol) and the tamper-proof device 30 through a wired connection using SWP protocol).

The tamper-proof device 30 comprises a processor, a working memory, a nonvolatile memory and a communication interface. The working memory may be a RAM and the nonvolatile memory may be a flash memory. In this example, the communication interface is designed to convey data according to several communication protocols: SWP with the NFC controller 50, Serial Peripheral Interface (SPI) with the TEE 44 and ISO7816-3 T=0 protocol with the baseband unit 10.

The nonvolatile memory comprises the operating system of the tamper-proof device 30 and two software containers 32 and 34. These software containers are separate and managed by the operating system as isolated entities. In other words, the operating system is able to guarantee that one software container cannot unduly access to data belonging to another software container.

The operating system is designed to activate and deactivate at least one software container.

The software container 32 is designed to emulate a eUICC. In other words, the software container 32 is configured to provide external entity with all features and services of a eUICC as defined by GSMA SGP .22 RSP Technical Specification V2.1 standard. The software container 32 can store data related to one or more Telecom operators subscriptions compatible with GSMA SGP .22 RSP Technical Specification V2.1 standard.

The software container 34 (eSE) stores a security domain (a profile) related to the issuer of the mobile phone 80 or an Original Equipment Manufacturer (OEM). The structure of this profile is compatible with GlobalPlatform Card Specification V2.3 standard. In addition, the software container 34 contains an admin security domain 38 and a set 36 of rules related to the activation of the software container 32. A detailed example is provided at FIG. 2.

It is to be noted that the software container 34 does not necessarily contain a profile which is related to the issuer of the mobile phone. It may contain any profile which is related to a non-Telecom actor.

The mobile phone 80 also comprises a SIM slot 20 able to connect a removable SIM/UICC 25.

The baseband unit 10 (also called baseband modem) comprises two communication interfaces INT1 and INT2 adapted to establish communication using ISO7816-3 T=0 or T=1 protocol with the tamper-proof device 30 and the SIM slot 20.

The baseband unit 10 comprises an activator agent 12 preferably implemented as a software program intended to be executed by a processor of the baseband unit 10. Alternatively it may be implemented as a specific ASIC.

The activator agent 12 is adapted to retrieve a location data broadcasted by a telecom network. For instance, it may retrieve the Mobile Country Code (MCC) and/or the Mobile Network Code (MNC) from an element 90 of the telecom network. It is to be noted that such a retrieving operation can be carried out without authenticating to the Telecom network.

The activator agent 12 can use the removable SIM 25 to get the MCC and/or MNC.

The activator agent 12 is adapted to retrieve the set 36 of rules from the software container 34. It may send a read command using ISO7816-3 T=0 protocol for example. Preferably, the access to the content of the software container 34 is secured by specific credentials and the activator agent 12 uses said specific credentials to generate the read command.

The activator agent 12 is adapted to check if activation of the software container 32 is authorized by a rule of the set 36 for the location data (retrieved from the Telecom network). Typically, the activator agent 12 scan the set 36 until it finds the rule to apply for the target location data.

The activator agent 12 is adapted to activate the software container 32 only in case of successful checking. In other word, the activator agent 12 is designed to request activation of the software container 32 only if it finds a rule relative to the location data which authorizes such an activation.

In this example, the activator agent 12 is adapted to request activation of the software container 32 by executing a script which has been precomputed with static keys and preinstalled in the baseband unit 10. The commands of the script are target the admin security domain 38. The script comprises a sequence of ordered commands:

- selection of an admin security domain 38 located in the tamper-proof device 30,
- establishment a secure channel between the admin security domain 38 and the activator agent 12,
- sending through the secure channel an activation command aiming at activating the software container 32.

The commands of the script are enciphered and signed using the static keys. Thus the series of commands can be securely executed by the tamper-proof device without requiring a connection (and authentication) to the telecom network.

It is to be noted that a single precomputed script can be deployed and run in a batch of mobile phones provided that the same static keyset has been deployed in the admin security domain of the tamper-proof device of each mobile phone belonging to the batch.

Preferably, the software container 32 is in deactivated state when the mobile phone 80 is issued. As long as the activator agent 12 does not find a rule authorizing the activation for the current location data, the software container 32 remains deactivated.

In one embodiment, the activator agent 12 automatically triggers the process of software container activation as soon as the mobile phone 80 enter an area covered by a telecom network.

In another embodiment, the activator agent 12 automatically triggers the process of software container activation as soon as the mobile phone 80 enter a new cell of a telecom network.

In another embodiment, the use of the mobile phone 80 may require the activator agent 12 to trigger the process of software container activation.

In a further embodiment, the activator agent 12 may receive a message though the telecom network which cause the activator agent 12 to trigger the process of software container activation.

Advantageously, the activator agent 12 is adapted to request the deactivation of the software container 32. For example, if the activator agent 12 detects a change of country, it can carry out the checking of the set 36 of rules and request the deactivation of the software container 32 if no rule authorize the software container 32 to be in activated state.

Advantageously, the Admin Security Domain 38 may be configured to allow the secure update of the set 36 by a remote server. The Admin Security Domain 38 can be used to perform—in post issuance—a secure update of set 36 of rules defined at secure element issuance.

Figure 2:
FIG. 2 is an example of set of rules stored in a tamper-proof device according to the invention.

FIG. 2 shows an example of set 36 of rules stored in a tamper-proof device 30 according to the invention.

In this example, the set is stored in a table comprising three columns: MCC, MNC and "Authorized?".

The column "authorized?" specifies the combination of MCC/MNC for which activate state is authorized for the software container 32.

Each line is a rule. For instance, the software container 32 cannot be in activate state for the combination MCC_2 and MNC_2.

In another embodiment, the table may be devoid of MNC column. In such a case, only the country identifier is taken into account to identity the applicable rule.

In another embodiment, the tamper-proof device 30 may comprise at least one additional software container which may be activated/deactivated and the table may comprise a further column specifying the software container to which the rule applies.

In another embodiment, the set 36 may be implemented as a list or a database.

Figure 3:
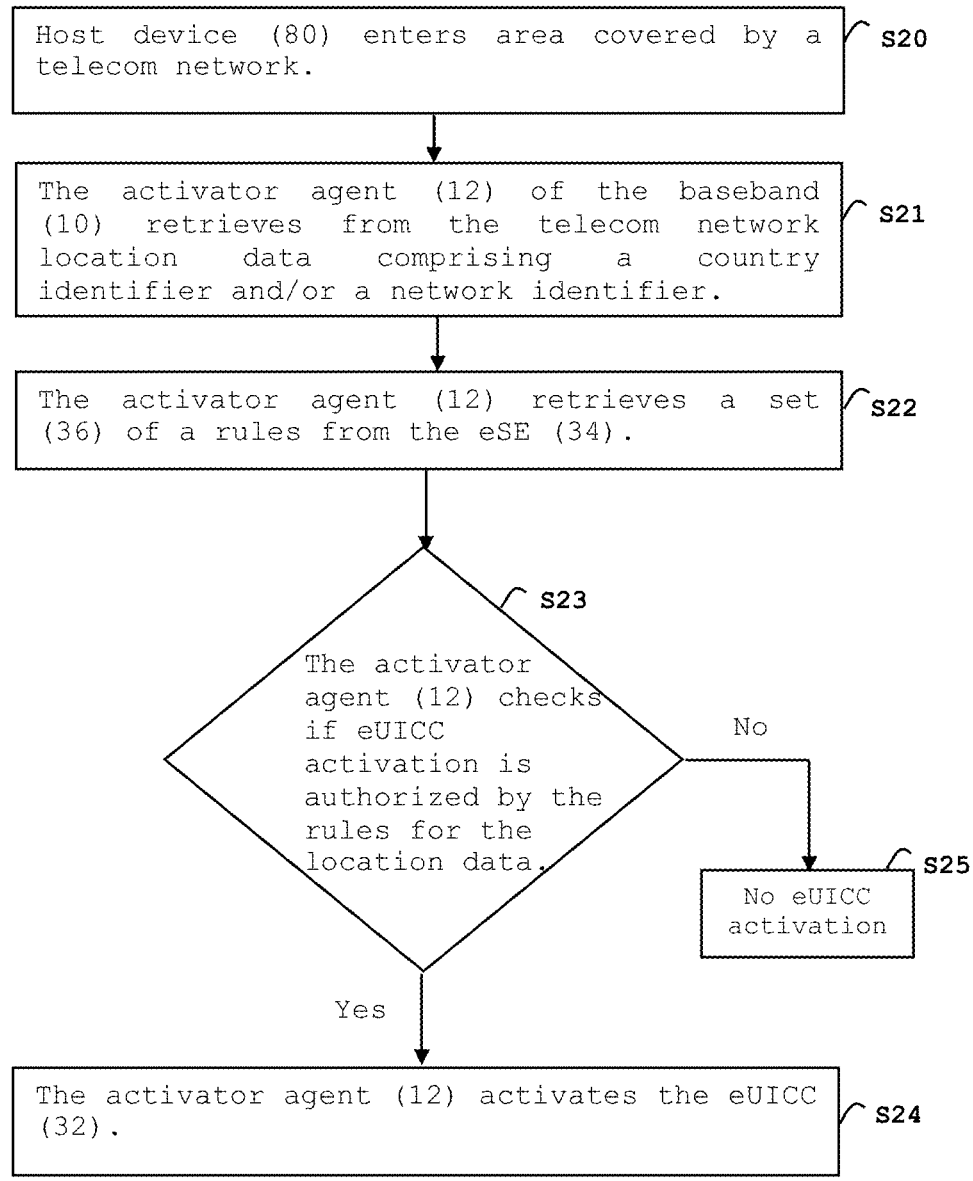
FIG. 3 depicts an example of flow chart for managing activation of a software container in a tamper-proof device according to the invention.

FIG. 3 depicts an example of flow chart for managing activation of a software container in a tamper-proof device according to the invention.

At step S20, the mobile phone 80 enters the area covered by a telecom network.

At step S21, the activator agent 12 is triggered by the detection of the telecom network. It retrieves a location data from the telecom network. Said location data comprises a country code (Ex: MCC) and/or a network identifier (Ex: MNC).

At step S22, the activator agent 12 retrieves a set 36 of rules from the software container 34.

At step S23, the activator agent 12 check if the activation of the software container 32 is authorized in relation to the location data.

If no rule specifies that the software container 32 can be in activate state, the software container 32 remains disabled or the activator agent 12 requests deactivation of the software container 32. (Step S25)

If a rule specifies that the software container 32 can be in activate state, the software container 32 requests the activation of the software container 32 at Step S24.

It must be understood, within the scope of the invention, that the above-described embodiments are provided as non-limitative examples. In particular, the features described in the presented embodiments and examples may be combined.

The tamper-proof device 30 may comprise more than two software containers.

The architecture of the mobile phone 80 is provided as example only. The invention is not limited to mobile phone and may apply to any host device comprising both a baseband unit and a tamper-proof device.

Thanks to the invention, the software container comprising a eUICC may be activated on the field without requesting to authenticate to a Telecom network.

The invention claimed is:

1. A method for managing a tamper-proof device comprising first and second software containers, said tamper-proof device is included in a host device comprising a baseband unit including an activator agent,
   - wherein said first software container is designed to emulate an eUICC and is in a deactivated state,
   - wherein the second software container comprises a set of rules, and wherein the activator agent retrieves both a location data broadcasted by a telecom network without authenticating to the Telecom network and said set of rules from the second software container,
   - wherein the activator agent checks if activation of the first software container is authorized by one of said rules for the location data,
   - and wherein the activator agent requests activation of the first software container only in case of successful checking by executing a script.

2. The method according to claim 1, wherein the location data comprise at least one of the following group: country identifier and network identifier.

3. The method according to claim 1, wherein said first software container comprises one or more Telecom profiles compatible with GSMA SGP .22 RSP Technical Specification standard and said second software container comprises a security domain compatible with GlobalPlatform Card Specification standard.

4. The method according to claim 1, wherein the tamper-proof device is an embedded secure element, an integrated secure element, a secure enclave, a smart card or a Machine-To-Machine device.

5. The method according to claim 1, wherein the activator agent requests activation of the first software container by executing a script which has been preinstalled in the baseband unit and both enciphered and signed with static keys, and wherein said script comprises the following ordered commands:
- selecting an admin security domain located in the tamper-proof device,
- establishing a secure channel between the admin security domain and said activator agent,
- sending through the secure channel of an activation command aiming at activating the first software container.

6. The method according to claim 1, wherein the activator agent requests deactivation of the first software container if none of said rules specifies that said first software container is authorized to be in active state.

7. A system comprising a baseband unit and a tamper-proof device comprising first and second software containers, said baseband unit is adapted to manage the tamper-proof device, said baseband unit and tamper-proof device is included in a host device, the baseband unit comprising an activator agent,
- wherein said first software container is designed to emulate an eUICC and is in a deactivated state;
- wherein said activator agent is configured to retrieve a location data broadcasted by a telecom network without authenticating to the Telecom network and to retrieve a set of rules from the second software container,
- wherein the activator agent is configured to check if activation of the first software container is authorized by one of said rules for the location data,
- and wherein the activator agent is configured to activate the first software container only in case of successful checking by executing a script.

8. The system according to claim 7, wherein the location data comprise at least one of the following group: country identifier and network identifier.

9. The system according to claim 7, wherein said first software container comprises a Telecom profile compatible with GSMA SGP .22 RSP Technical Specification standard and said second software container comprises a security domain compatible with GlobalPlatform Card Specification standard.

10. The system of claim 7 is embedded within a telecom device.

11. The telecom device according to claim 10, wherein the tamper-proof device is an embedded secure element, an integrated secure element, a secure enclave, a smart card or a Machine-To-Machine device.

12. The system according to claim 7, wherein the activator agent is configured to request activation of the first software container by executing a script which has been preinstalled in the baseband unit and both enciphered and signed with static keys, and wherein said script comprises the following ordered commands:
- selecting an admin security domain located in the tamper-proof device,
- establishing a secure channel between the admin security domain and said activator agent,
- sending through the secure channel of an activation command aiming at activating the first software container.

13. The system according to claim 7, wherein the activator agent is adapted to request deactivation of the first software container if none of said rules specifies that said first software container is authorized to be in active state.

* * * * *